United States Patent [19]
Johnston

[11] Patent Number: 4,981,458
[45] Date of Patent: Jan. 1, 1991

[54] COMBINATION QUEEN REARING NUCLEUS AND COMB HONEY HIVE

[76] Inventor: Michael Johnston, 29354 Westmore Rd., Shingletown, Calif. 96088

[21] Appl. No.: 936,932
[22] Filed: Nov. 28, 1986

Related U.S. Application Data

[63] Continuation-in-part of Ser. No. 573,678, Jan. 25, 1984, abandoned.

[51] Int. Cl.$^5$ .............................................. A01K 47/06
[52] U.S. Cl. ............................................ 449/7; 449/32
[58] Field of Search ........................... 6/1, 2 R, 4 R, 7

[56]     References Cited
         U.S. PATENT DOCUMENTS 211,779  1/1879  Pitts ......................................... 6/2 R
 1,447,713  3/1923  David ...................................... 6/2 R

FOREIGN PATENT DOCUMENTS 281029  8/1912  Fed. Rep. of Germany ......... 6/2 R
  827271  1/1952  Fed. Rep. of Germany ......... 6/2 R
 3327965  2/1985  Fed. Rep. of Germany ............. 6/1

Primary Examiner—Robert P. Swiatek

[57]     ABSTRACT

Bees are maintained in a hive complex which maintains multiple clusters of bees. The purpose of the complex is twofold: queen rearing and comb honey production. This hive allows for six compartments, each with its own entrance when used as a single story unit for queen rearing. When used for comb honey production, the first hive body can be converted to four compartments and succeeding hive bodies also divided into four compartments can then be stacked upon the first to provide additional brood space or to produce comb honey.

1 Claim, 1 Drawing Sheet

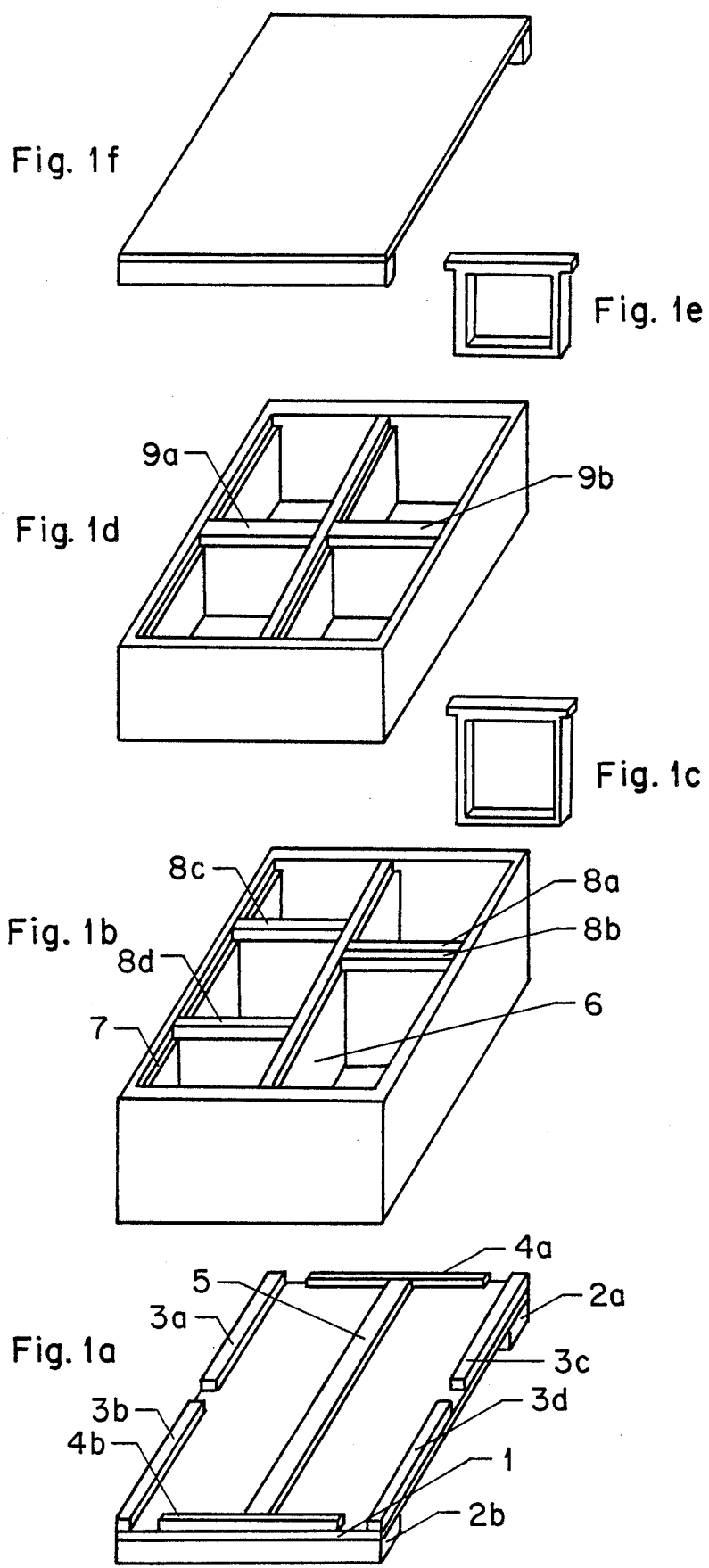

COMBINATION QUEEN REARING NUCLEUS AND COMB HONEY HIVE

CROSS REFERENCE TO RELATED APPLICATION

This application is a continuation in part of a previous application titled Combination Queen Rearing Nucleus And Comb Honey Hive, Ser. No.: 06/573,678, Filing date: January 25, 1984, and now abandoned.

RELATED PATENTS

| DOCUMENT NUMBER | DATE | NAME | COUNTRY |
|---|---|---|---|
| 203,927 | 5-1878 | PARKE | USA |
| 314,973 | 3-1885 | MITCHELL | USA |
| 1,552,139 | 9-1925 | GIBBS | USA |
| 4,241,467 | 12-1980 | PANNELL | USA |
| 4,332,045 | 6-1982 | SCHMIDT | USA |
| 4,546,509 | 10-1985 | HUETTER | USA |
| 126,127 | 9-1949 | PERSSON | SWEDEN |
| 956,836 | 2-1950 | VOLP | FRANCE |
| 2,820,593 | 11-1979 | DIMITRIJEVIC | W. GERMANY |

BACKGROUND OF THE INVENTION (1) Field of the Invention

The present invention generally relates to a method of housing four or more distinct clusters of bees in the same unit. More specifically, the present invention relates to a method of constructing the beehive so that each cluster can occupy as much space as is required for brood and honey production while remaining completely independent of other clusters also occupying the same unit, the various hive bodies are easily stackable and the hive is easily moved.

(2) Discussion of Prior Art

In 1851, Lorenzo L. Langstroth invented a beehive which has become standard in the United States, Canada, and many other countries. This beehive consists of a variable number of stacked hive bodies open at the top and bottom in which are hung frames containing individual combs, the lowermost hive body is placed upon a bottom board by which the bees enter the hive, and the uppermost hive body is covered by a lid. The most common size frame in use measures 9¼ inches high by 17⅝ inches long and is referred to as a standard frame. Two size hive bodies which accommodate either ten or eight frames are most commonly used today.

Generally, commercial hives used for honey or queen production consist either of a multistoried Langstroth hive containing a single cluster of bees or a single story unit with different compartments separated by divider boards and which houses any number of separate clusters of bees. The latter beehive is built for queen production but can be employed for honey production by covering it with a queen excluder and stacking honey supers on top; the worker bees from the different clusters then mix in the honey supers. The problem in using a hive such as this for honey production is due to the fact that bees from different clusters do not readily occupy a common honey super but do so after only running out of space for honey storage in the brood chamber. Filling all available comb space with honey then prevents the queen from laying eggs and the hive population in this type of hive tends to decline with a good honey flow.

A two queen system for increased honey production is a common practice in commercial apiculture today. Double queening is achieved by maintaining the queens in different hive bodies of the same unit separated by a queen excluder. Bees produced by the different queens are allowed to mix. This two queen system has a number of disadvantages. The second queen must be slowly introduced after the hive has built up a sufficiently large population and is not always accepted. The larger population produced by a two queen hive is sometimes too late for important honey flows and can endanger the hive with starvation if there is no honey flow. The bees tend to abandon the lowermost queen during overwintering and a single queen hive results the following Spring.

In the past, a number of patents were filed which demonstrated a system by which a vertical partition of two honey bee colonies was achieved. This was accomplished by either stacking different boxes side by side (Persson, Gibbs, Pannell) or by using a single partition without easily stackable hive bodies (Parke, Huetter). These past inventions were not employed by the commercial beekeeper because they were complicated, working them was time consuming and these hives could not be easily moved.

SUMMARY

In this system, a multiple colony hive is achieved by building easily stackable hive bodies which contain solid partitions built into the structure of the box. The bottom board is constructed so that each cluster has its own entrance and space on the surface of the board is divided between the different clusters. Partitions in the first hive body continue the partition started on the bottom board and are continued in succeeding hive bodies. The height of internal partitions is slightly shorter than external dimensions of a hive body so that as propolis and other debris build up, hive bodies continue to stack snugly. Using this system any number of multiple colony hives could be built with different outside dimensions, different numbers of clusters, and different size frames.

The purpose of this invention is to provide a hive which houses a number of compartments for queen rearing and which when not being employed for this purpose may be used for the production of comb honey. The Combination Queen Rearing Nucleus and Comb Honey Hive embodies the purpose of this invention. The lower most hive body of this hive can be arranged so that there is either six or four compartments each of which has its own entrance. By using a frame which has a narrower endbar than is usually employed by a standard frame, twenty-four frames will occupy the space available in one of these hive bodies. When used for queen rearing, the hive is operated as a single story unit and is divided into six compartments with four frames per compartment. In this mode, maximum production of queens is stressed. Through the use of movable divider boards which when pushed together close off two of the entrances, the hive can be converted to a four compartment hive with six frames per compartment. Additional hive bodies which are also divided into four compartments may then be stacked upon the first. In this manner more space is provided for brood or a surplus of comb honey. Deeper frames are used in brood chamber hive bodies than in comb honey supers in order to produce a more productive hive. Though a still deeper frame may prove to be the most optimum in this arrangement, the need for optimum productivity must be balanced by the need for a frame which can be easily worked.

The Combination Queen Rearing Nucleus and Comb Honey Hive is the first hive to use a queen rearing nucleus for the production of comb honey. It takes advantage of methods of construction to create a multiple cluster type of hive in which four clusters of bees move independently upward. Comb honey is produced in the form of small frames the novelty of which should increase their ability to sell in the marketplace. In addition, these small comb honey squares may be easily inserted and removed without disturbing the other comb honey squares. This solves the problem of having completed and partially completed comb honey squares in the same super.

BRIEF DESCRIPTION OF THE DRAWINGS

FIG. 1a is a drawing in perspective of the bottom board for the beehive.

FIG. 1b is a drawing in perspective of the first hivebody above the bottom board which is used as a brood chamber.

FIG. 1c is a drawing in perspective of a brood chamber frame.

FIG. 1d is a drawing in perspective of a comb honey super.

FIG. 1e is a drawing in perspective of a comb honey frame.

FIG. 1f is a drawing in perspective of a beehive lid.

DESCRIPTION OF THE PREFERRED EMBODIMENT

The bottom board FIG. 1a is essentially a flat surface 1. It is supported by two cleats 2a,2b on its lower surface. On the upper surface of the bottom board seven wooden strips 3a,b,c,d; 4a,b; 5 are nailed. By arranging the strips in the manner pictured, six entrances are formed. Four entrances are at the corners, two entrances are on the longer sides of the bottom board.

The first hive body FIG. 1b is normally nailed to the bottom board. It features a divider board 6 which is wide enough to accommodate a frame rest on both sides of its upper surface. There is also a frame rest 7 on both of the long sides of the hive body. Besides the center divider board, four other divider boards 8a,b,c,d are also present. These divider boards extend down into the bottom board and are movable. 8a and 8b are shown in the configuration which would be used for comb honey production; the entrance on the side of the bottom board would be closed off. The two compartments formed on either side of 8a and 8b would contain six frames each. 8c and 8d are shown in the configuration which would be used for queen production. Three compartments are formed, each containing four frames and each with its own entrance. During the operation of this hive, all of the divider boards are in only one configuration at a given time.

When all of the divider boards in the first hive body are in the comb honey configuration, additional hive bodies may be added. The second hive body FIG. 1d is a comb honey super. It differs from the first hive body in that it has a shallower depth, its frames FIG. 1e possess wider endbars, and all of its divider boards remain fixed in place. There are only two of the smaller divider boards 9a,9b but these are twice as thick as those used in the first hive body.

Not pictured is an additional hive body to be used as a brood chamber. This would be stacked between FIG. 1b and FIG. 1d. It would possess outside dimensions and contain frames as in FIG. 1b. Instead of movable divider boards 8a,b,c,d; it would possess fixed divider boards similar to those in FIG. 1d.

What is claimed is:

1. A beehive complex for maintaining independent clusters of bees comprising:
    (a) a divided horizontal rectangular bottom board with six entrances formed thereon one entrance being at each of the four corners and one being along each of the two longer sides of said board for allowing bees access to said beehive complex;
    (b) a plurality of rectangular hive bodies stacked one upon the other on top of said bottom board each hivebody having two sides and two ends with said sides being longer than said ends and with said side possessing a frame rest along upper inside edges;
    (c) a central vertical partition extending between said two ends of each of said bodies and parallel to the sides so that two compartments are formed in each body, each vertical partition possessing frame rests along its two upper edges;
    (d) the hive body resting on and directly above said bottom board having four movable vertical partitions, with two partitions being in each said compartment and extending between one of the said sides and the said central vertical partition, and parallel with said ends so that the two said compartments may be further divided into between four and six smaller compartments depending on the arrangement of said movable partitions;
    (e) the remaining hive bodies resting on and above the first having one fixed divider board per compartment each divider board extending between a side and said central vertical partition, the two fixed divider boards being located centrally within said compartments so that four equal sized compartments are formed;
    (f) a lid placed atop the uppermost of said plurality of hive bodies.

* * * * *